United States Patent [19]

Berta

[11] 3,963,402

[45] June 15, 1976

[54] METHOD AND APPARATUS FOR MAKING SHAPED SHELLS FOR HORS D'OEUVRES, SNACKS AND THE LIKE, AND FOOD ARTICLES PREPARED THEREBY

[75] Inventor: Peter Berta, Downey, Calif.

[73] Assignee: Fairmont Foods Company, Culver City, Calif.

[22] Filed: Apr. 1, 1974

[21] Appl. No.: 456,467

[52] U.S. Cl. .............................. 425/299; 425/398; 425/443; 99/349 ; 99/372
[51] Int. Cl.² ........................................ A21C 11/10
[58] Field of Search ........... 425/298, 292, 299, 398, 425/400, 443, 290, 291, 399; 99/353, 354, 372, 381, 382, 349

[56] References Cited
UNITED STATES PATENTS

| | | | |
|---|---|---|---|
| 1,989,724 | 2/1935 | Villanyi | 425/398 |
| 2,246,424 | 6/1941 | Turner | 425/299 X |
| 2,346,242 | 4/1944 | Turner | 425/299 X |
| 2,809,394 | 10/1957 | Harvey | 425/455 X |
| 2,811,744 | 11/1957 | Baldanza | 425/298 X |
| 2,954,584 | 10/1960 | Groves | 425/455 X |
| 3,081,491 | 3/1963 | Black | 425/292 |
| 3,155,055 | 11/1964 | Nishkian | 425/291 X |
| 3,425,363 | 2/1969 | Carbon | 99/349 X |
| 3,466,214 | 9/1969 | Polk et al. | 425/298 X |
| 3,597,800 | 8/1971 | Silverman | 425/400 X |

*Primary Examiner*—Francis S. Husar
*Assistant Examiner*—David S. Safran
*Attorney, Agent, or Firm*—Henry L. Brinks

[57] ABSTRACT

Cup-shaped shells suitable for use as hors d'oeuvres, snacks, and the like are made from leavened dough. The shells are cut from a crust of leavened dough and then shaped by dies and heated to form a concave configuration.

19 Claims, 11 Drawing Figures

U.S. Patent June 15, 1976 Sheet 1 of 4 3,963,402
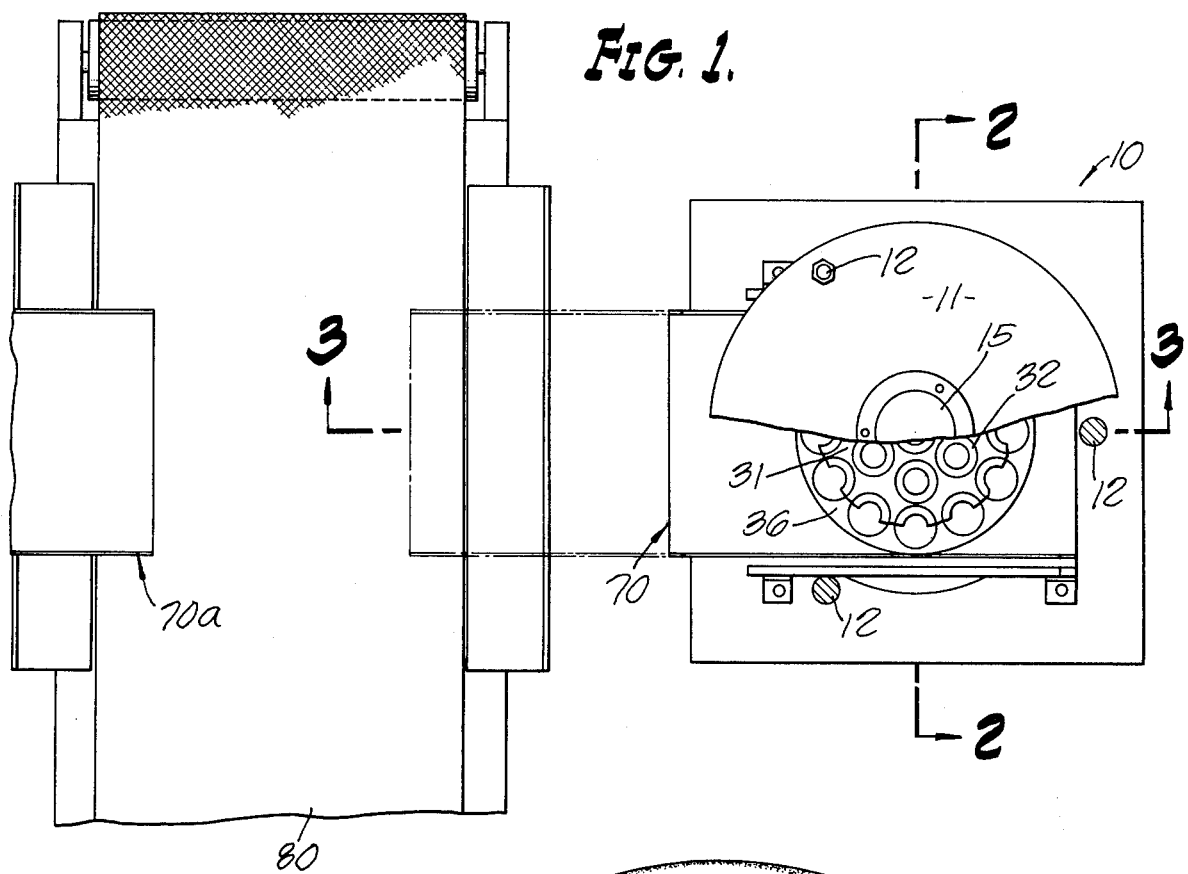
FIG. 1.
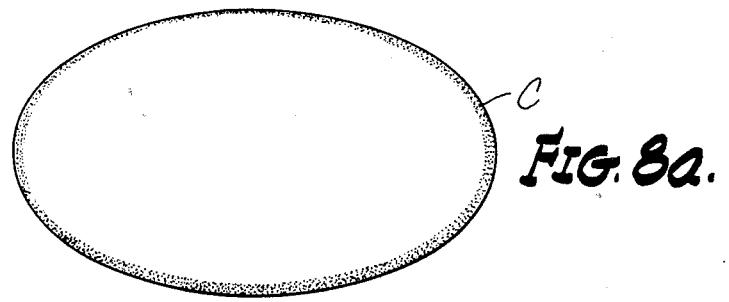
FIG. 8a.
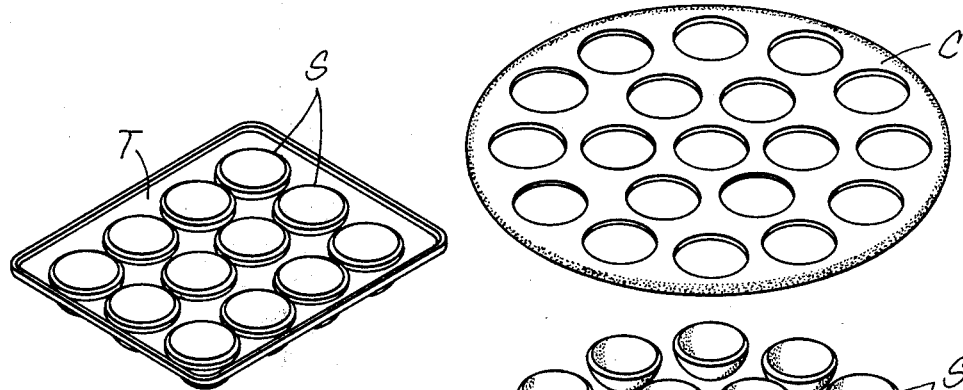
FIG. 8b.
FIG. 8d.
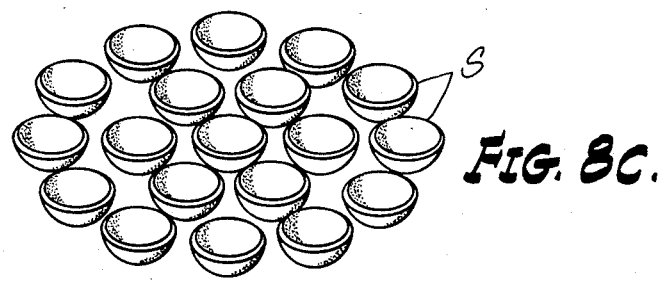
FIG. 8c.

METHOD AND APPARATUS FOR MAKING SHAPED SHELLS FOR HORS D'OEUVRES, SNACKS AND THE LIKE, AND FOOD ARTICLES PREPARED THEREBY

This invention relates to a method and apparatus for making shells for hors d'oeuvres, snacks and the like from leavened dough, and more particularly to making such shells with depressions so that they serve as containers.

BACKGROUND OF THE INVENTION

Although many shaped shells are used in bakery products, as for instance in tarts, pastries, and the like, they are made from unleavened dough. Shells of unleavened dough are ordinarily fragile, easily broken, and do not have the texture and hence the taste experience of leavened dough.

Leavened dough ordinarily is allowed to rise in a pan which determines its final shape, or in the case of pizza crusts, it is allowed to rise and then flattened to its final shape, after which it is baked, or partially baked. The shaping or molding of leavened dough into cup-shaped shells, especially partially baked shells, presents several problems.

Shells for hors d'oeuvres are usually flat. One pizza snack product currently on the market is made by cutting pizza crusts into small, circular, flat shells to which are applied pizza topping materials and other condiments. The topping, however, is spilled readily from the flat shells during handling. Moreover, upon final baking, as preparatory to serving, the topping materials, such as cheese, tend to run over the edge of the shells and stick to the pan. Moreover, the amounts and types of topping materials that can be supported by a small flat shell, as opposed to a concave shell, is limited.

The food industry is interested in making and selling snack foods having attractive taste, appearance, and texture. Although pizza is a popular food item, it is usually made and sold in sizes large enough to provide a complete meal, and it is desirable to make pizza in snack food sizes, particularly on a commercial scale, and yet to reduce the problems associated with making, as well as using, the small pizza shells.

SUMMARY OF THE OBJECTS OF THE INVENTION

Accordingly, it is an object of the invention to provide a process and apparatus which will provide shaped shells for hors d'oeuvres, snacks, and the like from leavened dough.

Another object of the invention is to provide a process and apparatus which eliminates many of the hand operations in the manufacture of shells for hors d'oeuvres, snacks, and the like.

Still another object of the invention is to provide a process and apparatus for making cup-shaped shells from leavened dough for containing the condiments used in making hors d'oeuvres, snacks, and the like.

Yet another object of the invention is to provide a process and apparatus which reduces the time and labor necessary to make shaped shells.

Still yet another object of the invention is to provide shells for hors d'oeuvres, snacks, and the like which are not readily broken.

It is a further object of the invention to provide shells for hors d'oeuvres, snacks, and the like which have distinctive texture and taste.

These and further objects of the invention will be apparent from the following description, attached drawings, and appended claims.

BRIEF DESCRIPTION OF THE DRAWINGS

FIG. 1 is a plan view with some of the parts broken away illustrating a reciprocating tray for removing the shells.

FIG. 8a illustrates a partially baked pizza crust which is supplied to the apparatus of FIG. 1.

FIG. 8b illustrates the remainder of the partially baked crust shown in FIG. 8a after the shells have been cut therefrom.

FIG. 8c illustrates the shells which have been cut from the crust of FIG. 8a and formed by the apparatus of FIG. 1.

FIG. 8d illustrates the shells as placed in appropriate foil trays for further processing.

DESCRIPTION OF THE PREFERRED EMBODIMENTS

Figure 2:
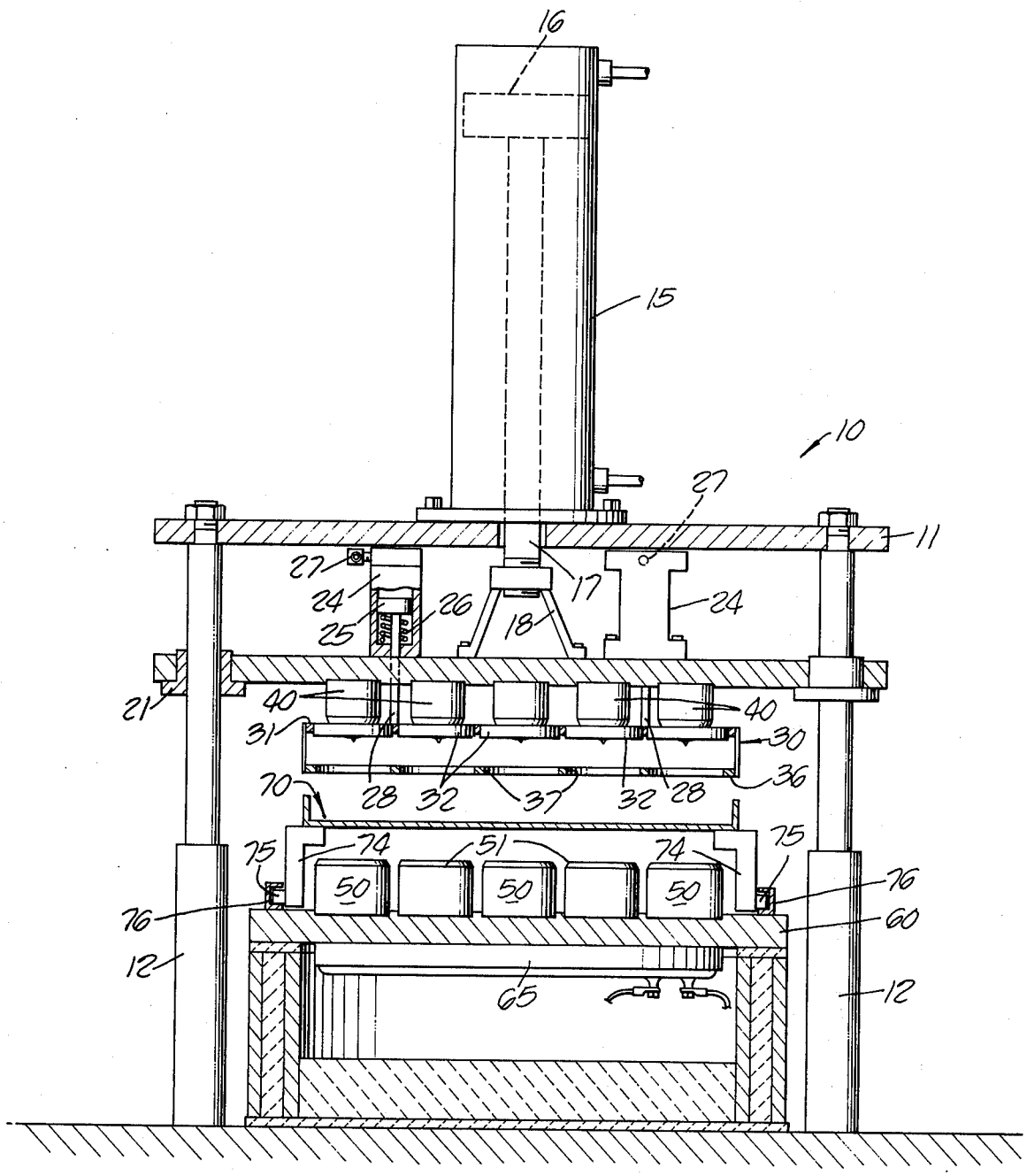
FIG. 2 is a view in front elevation of an apparatus embodying the present invention with some of the parts shown in section taken along line 2—2 of FIG. 1.

Referring to FIGS. 1 and 2, there is shown an apparatus 10 for making food articles, for example, shells suitable for use in hors d'oeuvres, snack items, and the like.

A platform 11 supported by corner posts 12 mounts a pneumatically operated piston and cylinder mechanism 15. The pneumatically operated piston, illustrated by dotted lines at 16, drives a rod 17 which extends downwardly through an opening in platform 11 to bracket 18 secured to movable carrier 20. The carrier 20 is provided with bearings 21 for sliding movements on posts 12.

Female dies 50 are mounted on a fixed bed 60 containing electrical heating element 65. Male dies 40 secured to the bottom surface of movable carrier 20 are positioned for mating cooperation with female dies 50.

Movable carrier 20 supports three penumatically operated piston and cylinder devices 24. The pistons 25 in devices 24 are biased upwardly by springs 26, but the springs are normally compressed by air pressure acting on the piston through an air supply port 27. The pistons 25, however, can be moved upwardly against the air pressure as will be more fully described thereinafter. The pistons 25 are provided with rods 28 which extend downwardly through an opening in carrier 20, and support an assembly 30 for loading and cutting the pizza shells C.

The assembly 30 has spaced top and bottom plates 31 and 36, respectively. Bottom plate 36 is provided with openings 37 so that it can be lowered over the female dies 50, as shown in FIGS. 4 to 6.

Figure 6:
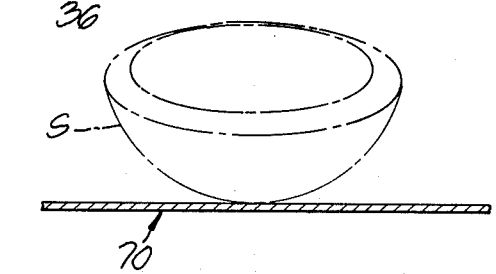
FIG. 6 is a view similar to FIG. 4 showing the withdrawal of the male die with the formed shell from the female die.
Figure 6:
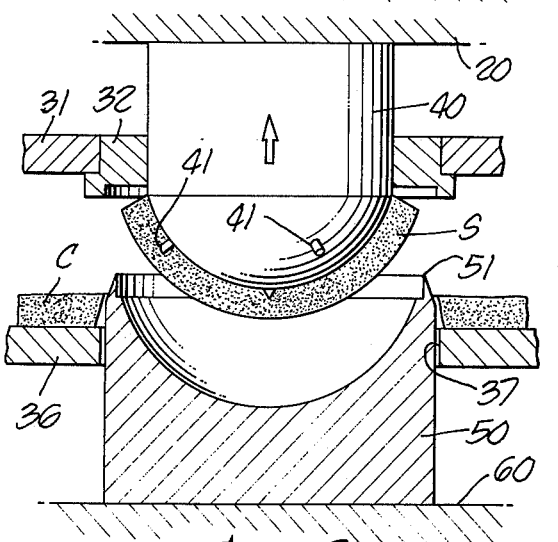
Figure 7:
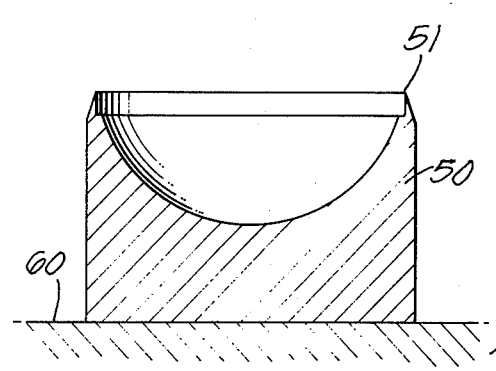
FIG. 7 is a view similar to FIG. 4 showing the removal of the shell from the male die.

Top plate 31 is provided with ring members 32. Ring members 32 cooperate with knife edges 51 on the female dies 50 for cutting operation, as shown in FIGS. 4 and 5. Ring members 32 also strip the formed shells from the male dies, as shown in FIGS. 6 and 7.

Figure 4:
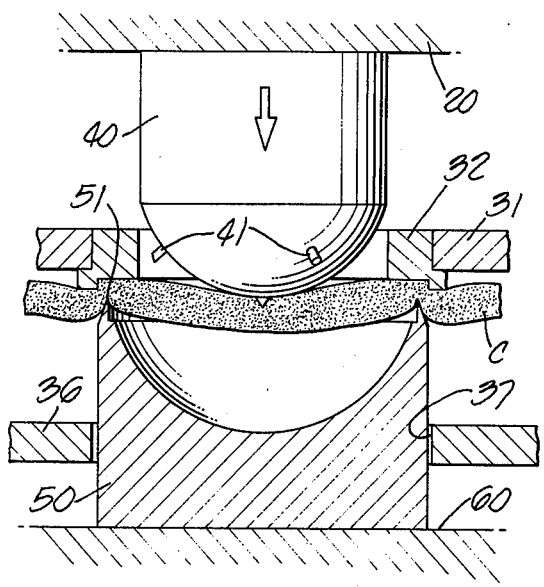
FIG. 4 is a fragmentary view of the male and female shell forming dies depicted in the apparatus of FIG. 1, and showing the cutting of the crust prior to the shell forming operation.
Figure 5:
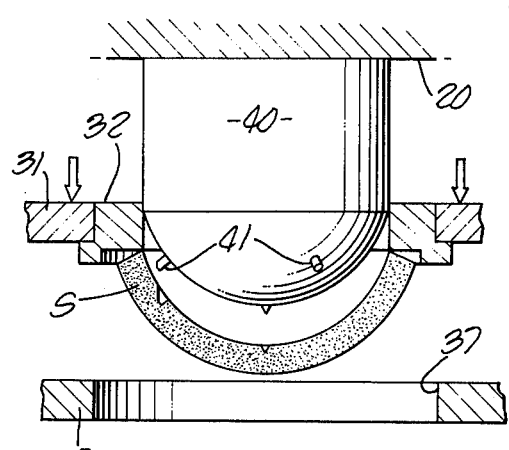
FIG. 5 is a view similar to FIG. 4 showing the dies in nested position.
Figure 5:
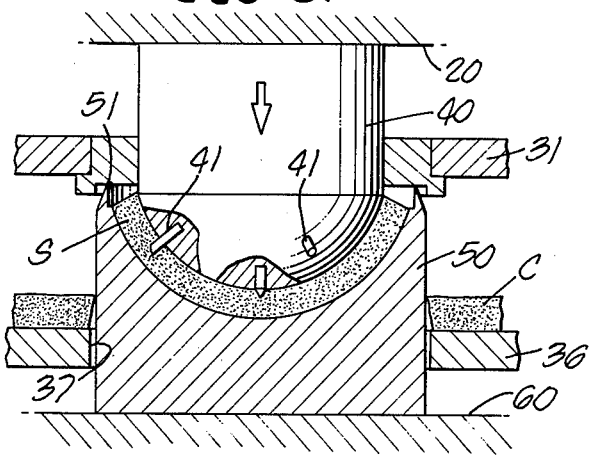

Referring particularly to FIGS. 4 and 5, the female dies 50 have a generally concave depressions for receiving the convex-shaped male dies 40. Cutting knife edges 51 encircle the concave depressions in the female dies.

The male dies 40 have a convex end portion which are provided with a plurality of protruding pins 41. The pins impale the shells during the forming operation as depicted in FIG. 5, so that as the male die is withdrawn from the female die, the shell also is withdrawn with the male die as depicted in FIG. 6.

The pins 41 are spaced from each other on the surfaces of the male dies. One pin is positioned parallel and at least one pin positioned non-parallel to the axis of movement of the male dies 40, for example at an acute angle to such movement. The pins 41 remove the molded shells S from the female dies 50.

As best shown in FIGS. 4 to 7, ring members 32 have an inner diameter slightly larger than the maximum diameter of the male dies 40 so that the ring members encircle the adjacent surface of the male dies. The ring members 32 perform a cutting operation in cooperation with the knife edge 51. As shown in FIG. 4, the pizza crust C is cut between rings 32 and knives 51.

The ring members 32 are telescoped over the male dies 40 during the molding operation as shown in FIG. 5. The ring members are retracted with the male dies as the shells are removed from the female dies as shown in FIG. 6. The ring members then move downwardly relative to the male dies in order to strip the formed shells S from the male dies as shown in FIG. 7.

Figure 3:
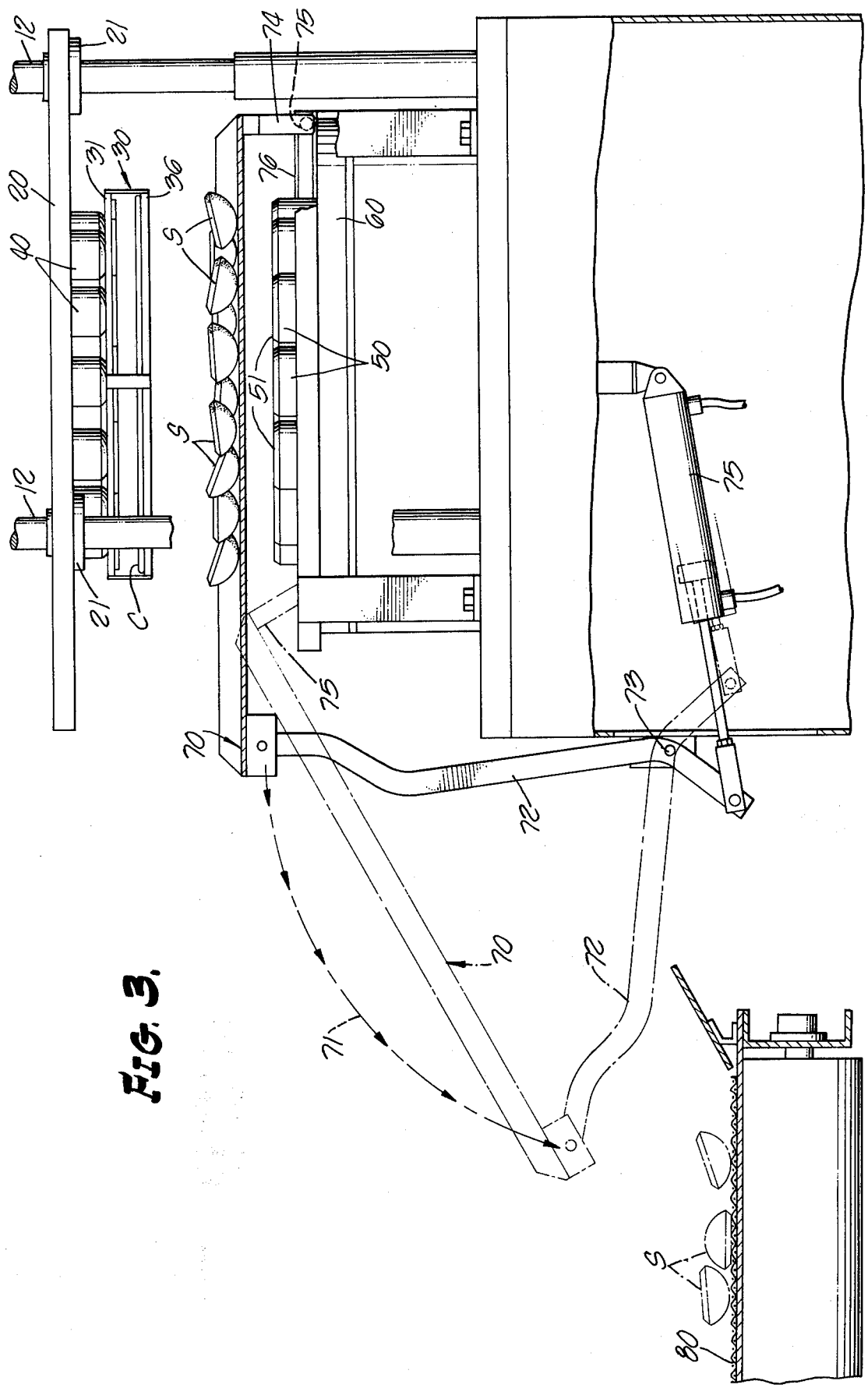
FIG. 3 is a longitudinal section taken along the line 3—3 of FIG. 1.

The shells S are removed from the male dies as shown in FIG. 7 and are collected in a reciprocating tray 70. The tray 70 reciprocates between a loading position (shown in full lines in FIG. 3) for collecting the shells under the male dies 40 after carrier 20 has been raised and a discharge position (shown in dotted lines in FIG. 3) in which the tray 70 discharges the shells S on conveyor 80. Referring to FIG. 3, tray 70 is shifted from loading position to discharge position as indicated by the arrows 71 before the male dies are lowered, in order to clear the path of movement of the male dies to nested positions in the female dies, and to discharge the shells S on the conveyor 80. The tray 70 is pivotally attached at one end to lever 72 which rotates about pin 73 by action of piston and cylinder system 75. The opposite end of the tray is mounted on arms 74 having slide elements 75 which are guided in track 76. When the tray 70 is moved by the lever as indicated by arrows 71, the tray 70 tilts to discharge the shells S on the conveyor 80.

Although only one machine is illustrated, it is readily apparent that several machines may be positioned along conveyor 80. For instance, as shown in FIG. 1, tray 70a of another machine (not shown) also discharges shells on conveyor 80.

Referring to FIG. 8a, there is shown a partially baked crust C in the form of a flat circular sheet made from leavened dough. The crust C is cut to form shells by the apparatus 10 described herein which leaves a remaining crust C as shown in FIG. 8b. The form of the shells S as discharged from the apparatus is shown in FIG. 8c.

The crust C is made from a leavened dough composition. A useful crust is a partially baked pizza crust, although the crust may be made have other formulations.

Referring to FIG. 8d, the shells S, after being cut and shaped from the leavened dough crust as described herein, are placed in trays T with the concave depressions of the shells S opening upwardly for filling with appropriate condiments.

Operation of the apparatus will now be described. Referring to FIG. 2, the sheet of partially baked leavened dough is placed in the loading area indicated in FIG. 2. The leavened sheet may be a partially baked pizza crust as illustrated in FIG. 8a. The piston 15 in cylinder is then operated to lower carrier 20.

Referring to FIGS. 4 to 7, as the carrier 20 is lowered, the assembly 30 containing the sheet of dough C is moved into position for several operations. The dough sheet C first is sub-divided in shells S as shown in FIG. 4. The shells S are then molded into a cup-like shape in an operation that makes a concave depression between the male and female dies as shown in FIG. 5. The molded shells then are removed from the female dies with the male dies by pins projecting from the male die as shown in FIG. 6 as the male dies are separated from the female dies. The shells next are removed from the male dies by movement of rings 32 indicated by arrow as shown in FIG. 7 and collected on reciprocating tray 70.

Referring to FIG. 4, the downward movement of the carrier 20 is indicated by the arrow. As the carrier is lowered, the bottom plate 36 which supports the dough sheet C is placed over the female dies 50. The dough sheet C then is supported upon the circular knives 51 located around the upper end of the female dies 50. As the carrier continues to be lowered, the rings 32 engage and cut the dough sheet C by pressing the dough sheet C against the knives 51, thereby forming circular shells of dough S. The remaining dough sheet C after the shells S have been cut therefrom is illustrated in FIG. 8b.

Referring to FIG. 5, the downward movement of the carrier 20 continues as indicated by the arrow until the male dies 40 are nested within the female dies 50, and the rings 32 are resting on the knives 51.

It will be observed by comparing FIG. 4 and FIG. 5 that there has been relative movement between the carrier 20 and the assembly 30. After the rings 32 come to engagement with the knives 51, thereby completing the cutting operation, the carrier 20 continues its downward movement relative to the assembly 30 until the male dies 40 are nested in the female dies 50. The relative movement is performed by pistons 25 which support the assembly 30. As the rings 32 rest on the knives 51, the pistons 25 are forced against the bias of the air pressure in cylinder 24 supplied by port 27, thereby allowing the carrier 20 to move relative to assembly 30.

The male dies 40 mold the shells S by coaction with females dies 50 into a concave-shaped or cup-shaped article. The shells S are allowed to remain in the position shown in FIG. 5 while a heating operation takes place; for example, heating at about 450°F for about 12 seconds.

In the molding position shown in FIG. 5, pins 41 are impaled into the shell S so that the shells will be removed when the male dies are removed from the female dies.

Referring to FIG. 6, the carrier 20 is raised as indicated by the arrow. This withdraws the male dies 40 from the female dies 50 with the shells S attached to the male dies by the pins 41. The assembly 30 is moved upwardly with the carrier 20, so that the rings remain positioned above the shells S. This is accomplished by reducing the air pressure supplied to cylinder 24 through port 27, so that the springs 26 hold the assembly 30 upwardly.

Referring to FIG. 7, after the carrier 20 has reached a point so that the lower plate 36 of the assembly 30 is spaced above the female dies, the tray 70 is inserted below the male dies. The pistons 25 (see FIG. 2) are then operated to lower the assembly 30 relative to the carrier 20, thereby moving the rings 32 downwardly as indicated by the arrow in FIG. 7 to strip the shells S from the male dies 40. The shells S, after they are removed from the male dies, are caught on the tray 70. The shells S discharged on the tray 70 have a concave configuration as illustrated in FIG. 8C.

The remaining portion of the dough sheet C carried on the lower plate 36 is removed. The apparatus then is ready for another cycle of operation.

As mentioned above, the sheet C is made from leavened dough. Leavened dough compositions comprise essentially flour, yeast, and water, to which may be added other ingredients to improve texture, flavor, taste, aroma, non-adhesion to baking pans, and the like. A leavened dough composition, for example, may contain flour in the range from about 50% to 70% by weight, water in the range from about 30% to 40% by weight, and sufficient yeast for leavening of the dough, such as yeast in amounts from about 1% to 3% by weight. Leavened dough compositions usually also contain shortening in amounts sufficient to prevent sticking of the dough to the receptacles during baking operations, for example, from about 3% to about 5% by weight shortening.

The leavened dough composition after admixing, dividing, and forming into balls, and allowing to rise, is spread into a sheet having a thickness from about ⅛ inch to about ⅜ inch, usually about ¼ inch, and then partially baked. The partially baked sheet or crusts may be circular in configuration as shown in FIG. 8a. During forming in the apparatus of FIG. 1, the shells are further heated, and emerge with a moisture content in the range from about 20% to about 30% by weight.

The following examples further illustrate the invention. Although specific terms are referred to, they are given for purposes of illustration, and are not given as limitations on the invention.

EXAMPLE A

A leavened dough composition suitable for making pizza crusts had the following ingredients:

| Ingredient | Weight Percent |
|---|---|
| Flour | 56.7% |
| Water | 32.4 |
| Shortening | 4.97 |
| Corn Meal | 3.41 |
| Yeast | 2.27 |
| Salt | 0.85 |
| Dough Softener | 0.23 |

| Ingredient | Weight Percent |
|---|---|
| Mold Inhibitor | 0.17 |

EXAMPLE B

Partially baked pizza crusts were made as follows. The dough composition of Example A above was admixed in a mixer. The dough then was divided into separate pieces by a divider and then shaped into balls by a rounder. The dough balls next were allowed to rise in a proofer and flattened into pizza shells for circular configuration illustrated in FIG. 8a by a stamper apparatus. After shaping by stamper, the pizza crusts are circular and, for example, of a 12 inch diameter, and a thickness of about 0.25 inch. After the crusts were made and shaped, they were partially baked in an oven at temperatures ranging from 550°–600°F for about 4 to 5½ minutes. After the partial baking operation, the pizza crusts had a moisture content from about 30% to 35% by weight.

EXAMPLE C

The partially baked pizza crusts of Example B were cut and molded into concave cup shells as illustrated in FIG. 8c, by the apparatus shown and described herein. During molding the cups were heated at temperatures in the range from about 425°F to about 475°F, usually at about 450°F, over a time period ranging from about 5 seconds to about 20 seconds, usually about 12 seconds. After molding, the cups had a moisture content in the range from about 20% to 30% by weight, and usually about 25% by weight.

EXAMPLE D

After forming to the cup-shaped shells, they were filled with pizza topping materials: pepperoni, cheese, sausage and the like to form small pizza snack items, and then frozen until used. Prior to serving, the pizza snacks were pre-heated in an oven at 425°–450°F, after which they were baked for 8–10 minutes. The shells had a moisture content after baking in the range from about 15% to about 23% by weight.

From the foregoing, the advantages of the invention should be apparent. The shells of the invention are cup-shaped so they contain topping materials without readily spilling. Moreover, when the snack items are baked, the tendency for the topping materials to run over the edges of the shells is materially reduced.

The leavened dough is molded into a cup-shaped shell by a unique process. The cup-shaped shells are made by a process that includes partially baking to a point at which the shells retain their shape, but yet contain sufficient moisture to allow further baking, for example, as for further baking immediately before serving.

In the drawings and specification, there has been set forth preferred embodiments of the invention, and although specific terms are employed, these are used in a generic and descriptive sense only, and not for purpose of limitation. Changes in form and proportion of parts, as well as substitution of equivalents are contemplated, as circumstances may suggest or render expedient, without departing from the spirit or scope of this invention, as further defined in the following claims. For instance, although circular concave shells for pizza snack items are illustrated, it is readily apparent that other cup-shaped shells, such as square or rectangular forms, may be made by the process and apparatus disclosed herein with changes in the configuration of the dies.

I claim:

1. An apparatus for molding food articles from a sheet of dough which is adapted to form a cup-shaped shell suitable for use in making hors d'oeuvres, tarts, and the like, comprising in combination:

a male die member;

a female die member positioned below the male die member with at least one of the male and female die members being adapted to be moved along an axis relatively toward and away from the other;

means for cutting the sheet of dough;

means for moving the die members relatively toward each other for nesting the male die member in the female die member in a forming operation for shaping the cut dough into a cup-shaped shell and for moving the die members relatively away from each other for separating the male die members from the female die member after the forming operation;

means for providing thermal energy to at least one of the die members for heating the shell during the forming operation;

a plurality of pin members spaced apart from each other on the surface of the male die member, with at least one of the pin members being positioned at an acute angle with respect to the axis of movement of the dies, for removing the shell with the male die member during the separation of the male die member from the female die member; and means for removing the shell from the male die member after the separation of the male die member from the female die member.

2. The apparatus of claim 1, wherein a plurality of the pin members are positioned at acute angles with respect to the axis of movement of the movable die member.

3. The apparatus of claim 1, wherein at least one pin member is positioned parallel to the axis of movement of the movable die member and at least one pin member is positioned at an acute angle with respect to the axis of movement of the movable die member.

4. The apparatus of claim 1, wherein the cutting means comprises a knife means associated with the female die member and opposed means associated with the male die member for cooperating with the knife means so as to cut the shell from the sheet of dough.

5. The apparatus of claim 1, wherein the means for removing the shell from the male die member includes a ring member surrounding the male die member and means for moving the ring member relative to the male die member in order to remove the shell.

6. The apparatus of claim 1, wherein the surface of the male die member which nests with the female die member has a convex shape and the surface of the female die member which nests with the male die member has a generally concave shape.

7. An apparatus for molding food articles which is adapted to cut and shape leavened dough from a flat sheet, comprising in combination:

a plurality of male die members;

female die members positioned below the male die members, the male die members and the female die members being adapted for nesting with each other and for movement along an axis relatively toward and away from each other;

means for moving the male die members and the female die members toward and away from each other;

means for cutting the flat sheet into a plurality of shells during movement of the male die members and the female die members toward each other;

heating means for molding the cut shells into cup-shaped configurations while the cut shells are located between the nested male die members and the female die members;

a plurality of spaced apart pin members located on the surface of each of the male die members for removing the shells with the male die members during the separation of the male die members from the female die members; and means for removing the molded shells from the male die members after the separation of the male die members from the female die members including a ring member surrounding each of the male die members and a means for moving the ring members relative to the male die members in order to remove the molded shells.

8. The apparatus of claim 7, wherein at least one of the pin members on each of the male die members is positioned at an acute angle with respect to the axis of movement of the die members.

9. The apparatus of claim 7, wherein at least one pin member on each of the male die members is positioned parallel to the axis of movement of the die members and at least one pin member on each of the male die members is positioned at an acute angle with respect to the axis of movement of the die members.

10. The apparatus of claim 7, further comprising a means for holding the flat sheet of dough between the male die members and the female die members.

11. The apparatus of claim 7, wherein the cutting means comprises a knife means associated with each of the female die members and opposed means associated with each of the male die members for cooperating with the knife means.

12. The apparatus of claim 7, further comprising means for collecting the molded shells after they have been removed from the male die members.

13. The apparatus of claim 7, wherein the female die members have generally concave depressions for nesting with the convex-shaped male die members.

14. The apparatus of claim 7, wherein the ring members also cooperate with the knife means associated with the female die members for cutting the flat sheet into a plurality of shells.

15. The apparatus of claim 8, wherein the cutting means comprises a knife means associated with each of the female die members and a ring member surrounding each of the male die members for cooperating with the knife means; wherein the means for removing the shells from the male die members includes the ring members and a means for moving the ring members relative to the male die members; and wherein the female die members have generally concave depressions for nesting with the generally convex-shaped male die members.

16. The apparatus of claim 7, wherein a plurality of the pin members are positioned at acute angles with respect to the axis of movement of the die members.

17. An apparatus for molding food articles from dough which is adapted to form a cup-shaped shell suitable for use in making hors d'oeuvres, tarts, and the like, comprising in combination:
- a male die member;
- a female die member positioned below the male die member with at least one of the die members being adapted to be moved along an axis relatively toward and away from the other;
- means for moving the die members relatively toward each other for nesting the male die member in the female die member in a forming operation for shaping the dough into a cup-shaped shell and for moving the die members relatively away from each other for separating the male die member from the female die member after the forming operation;
- means for providing thermal energy to at least one of the die members for heating the shell during the forming operation;
- a plurality of pin members spaced apart from each other on the surface of the male die member, with at least one of the pin members being positioned at an acute angle with respect to the axis of movement of the dies, for removing the shell with the male die member from the female die member; and
- means for removing the shell from the male die member after the separation of the male die member from the female die member.

18. The apparatus of claim 17, wherein a plurality of the pin members are positioned at acute angles with respect to the axis of movement of the movable die member.

19. The apparatus of claim 17, wherein the means for removing the shell from the male die member includes a ring member surrounding the male die member and means for removing the ring member relative to the male die member in order to remove the shell.

* * * * *